(12) United States Patent
Plesman

(10) Patent No.: US 8,041,954 B2
(45) Date of Patent: Oct. 18, 2011

(54) METHOD AND SYSTEM FOR PROVIDING A SECURE LOGIN SOLUTION USING ONE-TIME PASSWORDS

(76) Inventor: Paul Plesman, Richmond Hill (CA)

( * ) Notice: Subject to any disclaimer, the term of this patent is extended or adjusted under 35 U.S.C. 154(b) by 852 days.

(21) Appl. No.: 11/946,773

(22) Filed: Nov. 28, 2007

(65) Prior Publication Data

US 2009/0013402 A1 Jan. 8, 2009

Related U.S. Application Data

(60) Provisional application No. 60/868,941, filed on Dec. 7, 2006.

(51) Int. Cl.
*G06F 21/00* (2006.01)
*G06F 7/04* (2006.01)
(52) U.S. Cl. ................ 713/183; 713/182; 726/2; 726/3; 726/16
(58) Field of Classification Search .......... 713/168–170, 713/182–185; 726/2–6, 16–21
See application file for complete search history.

(56) References Cited

U.S. PATENT DOCUMENTS

| | | | | |
|---|---|---|---|---|
| 4,926,481 A | * | 5/1990 | Collins, Jr. ..................... | 713/184 |
| 5,276,314 A | * | 1/1994 | Martino et al. .............. | 340/5.27 |
| 5,428,349 A | * | 6/1995 | Baker ........................... | 340/5.54 |
| 5,465,084 A | * | 11/1995 | Cottrell ........................ | 340/5.27 |
| 6,209,104 B1 | | 3/2001 | Jalili | |
| 6,246,769 B1 | * | 6/2001 | Kohut ............................. | 380/45 |
| 6,571,336 B1 | * | 5/2003 | Smith, Jr. ...................... | 713/184 |
| 2002/0129269 A1 | * | 9/2002 | Cheol-Shin et al. .......... | 713/200 |
| 2004/0225880 A1 | * | 11/2004 | Mizrah ......................... | 713/155 |
| 2005/0027990 A1 | * | 2/2005 | Ogawa .......................... | 713/184 |
| 2005/0160297 A1 | * | 7/2005 | Ogawa .......................... | 713/202 |
| 2005/0254650 A1 | * | 11/2005 | Sakurai et al. ................ | 380/268 |
| 2006/0053301 A1 | * | 3/2006 | Shin .............................. | 713/183 |
| 2006/0248344 A1 | * | 11/2006 | Yang ............................. | 713/183 |
| 2007/0050635 A1 | * | 3/2007 | Popp ............................. | 713/185 |
| 2007/0266428 A1 | * | 11/2007 | Downes et al. .................. | 726/5 |
| 2009/0144554 A1 | * | 6/2009 | Baker ........................... | 713/183 |

FOREIGN PATENT DOCUMENTS

CA 2611549 A1 * 5/2009

OTHER PUBLICATIONS

U.S. Appl. No. 60/779,522.*

* cited by examiner

*Primary Examiner* — Beemnet Dada
*Assistant Examiner* — Darren B Schwartz

(57) ABSTRACT

A method and system for a secure login solution for users logging into computers and systems that require authentication is provided incorporating one-time passwords. The method and system allows a user to establish a login key combination in relation to a login key structure. The login key combination is in association with an identification means, such as a username/ID, and allows the user to generate a one-time passcode in response to a random login key. The method and system is directed at situations where the user desires to log into a system from a computer or other electronic device that may not be secure, including for example from computers or devices other than the user's own and/or by using a communications connection that may not be secure, such as a wireless network connection. The method and system is simple and easy to implement and does not require the use of physical devices.

3 Claims, 7 Drawing Sheets

---

User login

This option can only be used if you have previously defined a login combination.
If you have not yet done so, please use the standard login.

Username [ ]

Login key   e 4 c 6 s
            n 7 7 8 7
            h 2 4 5 7
            v 9 t r g
            Time to key expiry ▬▬▬▬▬▬

Passcode [ ]

[ Log in ]  [ Reset ]

Sample login procedure

| User login |
|---|

For enhanced security when logging in click here.

Username [ ]
Password [ ]

[ Log in ]

Fig. 2

| User login |
|---|

This option can only be used if you have previously defined a login combination.
If you have not yet done so, please use the standard login.

Username [ ]

Login key  yl7s-3i3z-o2b7-d9cy-74da
 This key expires in 30 seconds!

Passcode [ ]

[ Log in ]  [ Reset ]

Fig. 3

| User login |
|---|

This option can only be used if you have previously defined a login combination.
If you have not yet done so, please use the standard login.

Username [ ]

Login key  e 4 c 6 s
          n 7 7 8 7
          h 2 4 5 7
          v 9 t r g
 Time to key expiry ▬▬▬▬▬▬▬

Passcode [ ]

[ Log in ]  [ Reset ]

Fig. 4

Sample login combination
creation/modification procedure

| Set Login Combination |
|---|

Login key    yl7s-3i3z-o2b7-d9cy-74da
This key expires in 30 seconds!

Passcode   [          ]

[ Continue ]  [ Reset ]

Fig. 6

| Set Login Combination |
|---|

Login key    e 4 c 6 s
                n 7 7 8 7
                h 2 4 5 7
                v 9 t r g
Time to key expiry ▬▬▬▬▬▬▬

Passcode   [          ]

[ Continue ]  [ Reset ]

Fig. 7

| Set Login Combination |
|---|

To provide enhanced security when accessing your information from a public or other insecure environment, please set your login combination now.
Click any 8 characters from the login key shown below, in any sequence (forwards and/or backwards) and <u>one at a time</u>, in the order in which you will enter them to log in. Make sure that the combination you choose is something you will find easy to remember.
The same character may be clicked more than once.

You have selected 1 characters

<u>b</u> <u>5</u> <u>r</u> <u>v</u> - <u>3</u> <u>5</u> <u>u</u> <u>4</u> - <u>i</u> <u>4</u> <u>3</u> <u>4</u> - <u>b</u> <u>d</u> <u>6</u> <u>m</u> - <u>t</u> <u>6</u> <u>x</u> <u>9</u>

[ Reset ]

Fig. 8

| Set Login Combination |

To provide enhanced security when accessing your information from a public or other insecure environment, please set your login combination now.
Click any 8 characters from the login key shown below, in any sequence (forwards and/or backwards) and <u>one at a time</u>, in the order in which you will enter them to log in. Make sure that the combination you choose is something you will find easy to remember.
The same character may be clicked more than once.

You have selected 0 characters

<u>b</u>  <u>5</u>  <u>r</u>  <u>v</u>  <u>3</u>
<u>5</u>  <u>u</u>  <u>4</u>  <u>i</u>  <u>4</u>
<u>3</u>  <u>4</u>  <u>b</u>  <u>d</u>  <u>6</u>
<u>m</u>  <u>t</u>  <u>6</u>  <u>x</u>  <u>9</u>

[ Reset ]

<u>Fig. 9</u>

| Set Login Combination |

Your login combination was recorded.
To confirm, please enter the passcode as you would enter it to log in and click Test.

Login key   yl7s-3i3z-o2b7-d9cy-74da
               This key expires in 30 seconds!

Passcode  [        ]

[ Test ]  [ Reset ]

<u>Fig. 10</u>

| Set Login Combination |

Your login combination was recorded.
To confirm, please enter the passcode as you would enter it to log in and click Test.

Login key    e 4 c 6 s
                n 7 7 8 7
                h 2 4 5 7
                v 9 t r g
                Time to key expiry ▬▬▬▬▬▬

Passcode  [       ]

[ Test ]  [ Reset ]

Fig. 11

| Set Login Combination |

Success! The combination you entered was correct.

Fig. 12

Set Login Combination

The combination you entered was incorrect.
Please try again or click Set new login combination.

Login key   yl7s-3i3z-o2b7-d9cy-74da
            This key expires in 30 seconds!

Passcode    [          ]

[ Test ]   [ Reset ]

[ Set new login combination ]

Fig. 13

Set Login Combination

The combination you entered was incorrect.
Please try again or click Set new login combination.

Login key   e 4 c 6 s
            n 7 7 8 7
            h 2 4 5 7
            v 9 t r g
            Time to key expiry ▬▬▬▬▬▬▬

Passcode    [          ]

[ Test ]   [ Reset ]

[ Set new login combination ]

Fig. 14

METHOD AND SYSTEM FOR PROVIDING A SECURE LOGIN SOLUTION USING ONE-TIME PASSWORDS

This application claims the benefit of U.S. Provisional Application No. 60/868,941, filed Dec. 7, 2006

FIELD OF THE INVENTION

The present invention relates to methods and systems for a secure login solution for users of computers and systems, local and/or remote. The present invention further relates to identification means, such as usernames/IDs, PIN codes and one-time passwords.

BACKGROUND OF THE INVENTION

Every day computer users login to computers and systems that require authentication by providing the authenticating system with information that will positively identify the user. In most cases that information consists of a username/ID and a matching static, reusable password. Replacing such static passwords with single-use passwords and, where possible, using two-factor authentication is one approach for securing corporate networks, applications and information assets.

Unfortunately, use or transfer of sensitive information can create security vulnerabilities for many different reasons. For example, in situations where the user attempts to login to a system from a computer or other electronic device using a communications connection, such as the Internet, information traveling over the network may be intercepted by unauthorized individuals using network sniffers. This information can then subsequently be used to illegally obtain access to the system. The use of more secure communications protocols, such as Secure Socket Layer (SSL), improves security by encrypting the information being transmitted, thereby making it virtually impossible for others to use it to gain access to the system, even if they manage to intercept the user identifying information. Unfortunately many authenticating systems do not use secure protocols, leaving sensitive information vulnerable to attack.

Another problem with authentication using a static, reusable password is that hackers may be able to gain access to the system by guessing the password. This applies not only to weak passwords that can be uncovered by using dictionary attacks, often passwords include the user's name, his nickname, spouse's or pet's name, etc. Although this threat can be reduced by having the authenticating system impose a maximum number of login attempts before blocking the account, it remains a real threat nonetheless.

One significant security threat involves widely available spyware, including keystroke capturing software which, as the name suggests, captures the keystrokes that are made on a computer's keyboard and stores this information for later retrieval by or transmission to the person or persons who installed the software or who know of its presence. In many cases, the existence of this software is difficult or virtually impossible to detect. Even if encryption of the information is used during transmission over a network, the presence of this type of software on the computer from which a user logs in is not going to provide any security, as the username/ID and password have already been captured at the source, before it has been encrypted. This threat is particularly acute when the user is accessing systems from a computer or other electronic device that may not be his own, such as other people's computers or, more particularly, computers found in public places such as hotels, airports and Internet cafes, to name but a few.

In view of these vulnerabilities and in order to limit the risk of unauthorized access, methods are available that enable the use of one-time passwords (OTP), thereby greatly increasing login security. In such cases, where passwords are only valid for a single login, even capturing or knowing the password will be meaningless as it can only be used once. In broad terms there are two major types of OTP solutions: (i) hardware based solutions; and (ii) S/KEY based solutions.

Hardware Based Solutions

The vast majority of OTP solutions involve the use of some kind of physical device, such as tokens, smart cards, USB flash drives, etc., that will generate them. Companies providing such hardware based solutions include VERISIGN™, ACTIVIDENTITY™, VASCO™ and RSA SECURITY™ to name a few. Most, like RSA's authentication token for example, generate a new 6-digit numeric passcode every 30 or 60 seconds that will be used together with a user's PIN code to create a one-time password. This is generally referred to as two-factor authentication.

Other approaches, such as the systems and methods taught in European Patent Application No. EP 1 445 917 to Kuclar et al. and U.S. Patent Application No. 2003/0172272 to Ehlers et al. for example, include the use of a mobile communications device, where the one-time password is sent by the authenticating system to the user's mobile phone or other mobile device via a Short Message Service (SMS). Other systems, such as those described in U.S. Patent Application No. 2002/0038426 to Pettersson et al. and U.S. Pat. No. 6,636,973 to Bagley for example, use biometric devices such as iris scanners and fingerprint scanners to positively identify the user. All of the above described methods require the use of a physical device.

The use of physical devices however has several distinct disadvantages. In addition to the significant cost of implementing device-based solutions, particularly where the number of users is large, their biggest drawback is that the authentication device may not be available, be rendered useless by abuse or accident or may be lost. In the latter case there is a theoretical chance of an individual gaining unauthorized access to a system where for example key-stroke logging software was running on the computer from which a login was attempted and the username/ID and the static password or PIN code have already been captured. Although the risk in the case of loss can be minimized by the immediate reporting of the loss of the device, all scenarios mentioned above will prevent a legitimate user who, for whatever reason, does not have access to the authentication device from obtaining access to the remote system. The use of non-OTP access in that case could of course significantly compromise security.

S/KEY Based Solutions

These are software solutions based on S/KEY, a one-time, challenge-response password scheme developed for use on UNIX™-like operating systems to authenticate a user based on a one-way hash function. Generic open source implementations can be used to enable its use on other systems.

A user's real password is not directly transmitted across the network. Rather, the real password is combined with a short set of characters and a decrementing counter to form a one-time password. As the one-time password is only used once, passwords intercepted by a password sniffer or keystroke logger are not useful to an attacker.

Because the short set of characters does not change until the counter reaches zero, it is possible to prepare a list of single-use passwords, in sequence, that can be carried by the user. Alternatively, the user can present the password, characters and desired counter value to a local calculator to generate the appropriate one-time password that can then be transmitted over the network.

The S/KEY solution, however, also has drawbacks. It is sensitive to a "man in the middle" attack if used by itself, although this could be solved by using SSL or a similar security protocol which authenticates the server and gives point-to-point security between the client and server.

In addition, the secret passwords used by S/KEY solutions may of course never travel across an insecure network and it is the user's responsibility to see to this. A user should therefore only be able to change his secret password or create a new list of one-time passwords when logged in from a machine on a secure network or on the console of the system.

Lastly, because the number of hash function iterations executed by the user decreases by one each time, this solution of course requires the user to re-initialize the system whenever the last single-use password has been used or he will be unable to log in again.

One approach where no device is necessary is taught in U.S. Patent Application No. 2006/0206919 to Montgomery et al., which describes a method where the user is required to generate a one-time PIN code by performing mathematical manipulations on the user's known PIN code and a system supplied random number or on the user's known PIN code, a system supplied random number and a transformation PIN code, making it prone to error and less user-friendly.

In view of the foregoing, what are needed are methods and systems for enabling secure login solutions using OTP that overcome the limitations and disadvantages of the prior art. In particular, what are needed are methods and systems for enabling secure login solutions using OTP that are easy to implement, require no physical devices, require no extra computational power, and require no mathematical or other data manipulation on the part of the user.

SUMMARY OF THE INVENTION

The present invention is directed at a method and system for a secure login solution using one-time passwords.

In one aspect, the present invention is a method for enabling a user to login to a system requiring authentication, the method comprising: providing a random login key to the user; receiving from the user identification means and a passcode, wherein the passcode is generated by the user in response to the random login key and is based on a login key combination previously defined by the user; and comparing the passcode to the random login key based on the login key combination associated with the user, and authenticate the user if the user supplied passcode is a match.

The random login key in accordance with the present invention is a number of characters, of which both the length and the structure are defined by the authenticating system. This login key can be numeric, alphabetic or alpha-numeric (lower case and/or upper case), where a case-sensitive alpha-numeric key of course provides the greatest security. The login key is provided to the user in accordance with a particular login key structure, which can be simply a line of characters, or a matrix of characters, for example. Other structures are possible and depend on the number of characters in the login key.

The user must first create a login key combination. The login key combination is a fixed number of characters for each user chosen in a particular sequence in response to a login key structure. The login key combination dictates the passcode which will be entered in response to the random login key, the passcode enabling authentication on subsequent logins.

The login key combination is established by the user and is stored in association with the user's identification means, such as his username/ID. The user authenticates himself by providing the authenticating system with the identification means and a passcode, wherein the passcode consists of the specific number of characters from the random login key, entered in the specific sequence, as defined by the user's login key combination and available to the authenticating system. In two-factor authentication, this will be combined with the user's PIN code.

Although the number of characters used in the random login key should be fixed for each authenticating system, it can theoretically be of any length. The larger the number of characters in the random login key, and the greater the number of characters required to create the passcode, the greater the security. To enhance security even further, passcodes could be made case sensitive and could even include special characters.

In another aspect, the present invention is a system for authenticating a user on a computer, the system comprising: a display means linked to the computer, whereby the display means is operable to provide instructions to the user; an input means linked to the computer, whereby the input means enables the user to provide identification means and a passcode; a means for storing and retrieving the user's information, the user's information including the identification means and a login key combination previously defined by the user; and an authentication facility linked to the computer, the authentication facility being operable to provide instructions to the computer to: (i) display a random login key to the user via the display means; (ii) receive from the user the identification means and the passcode, wherein the passcode is generated by the user in response to the random login key and is based on the login key combination associated with the user; and (iii) compare the passcode to the random login key based on the login key combination associated with the user, and authenticate the user if the user supplied passcode is a match.

In yet another aspect, the present invention is a related computer program product.

The present invention provides a simple and elegant means of providing a secure login solution, and can be implemented alone or by using two-factor authentication. The present invention does not require an authentication or other device, and the method and system are much more user-friendly than existing methods not requiring a device.

BRIEF DESCRIPTION OF THE DRAWINGS

A detailed description of the preferred embodiments is provided herein below by way of example only and with reference to the following drawings, in which:

FIG. 2-4 illustrate example screen shots of a login procedure;

FIG. 6-14 illustrate example screen shots of a login combination definition procedure.

Figure 1:
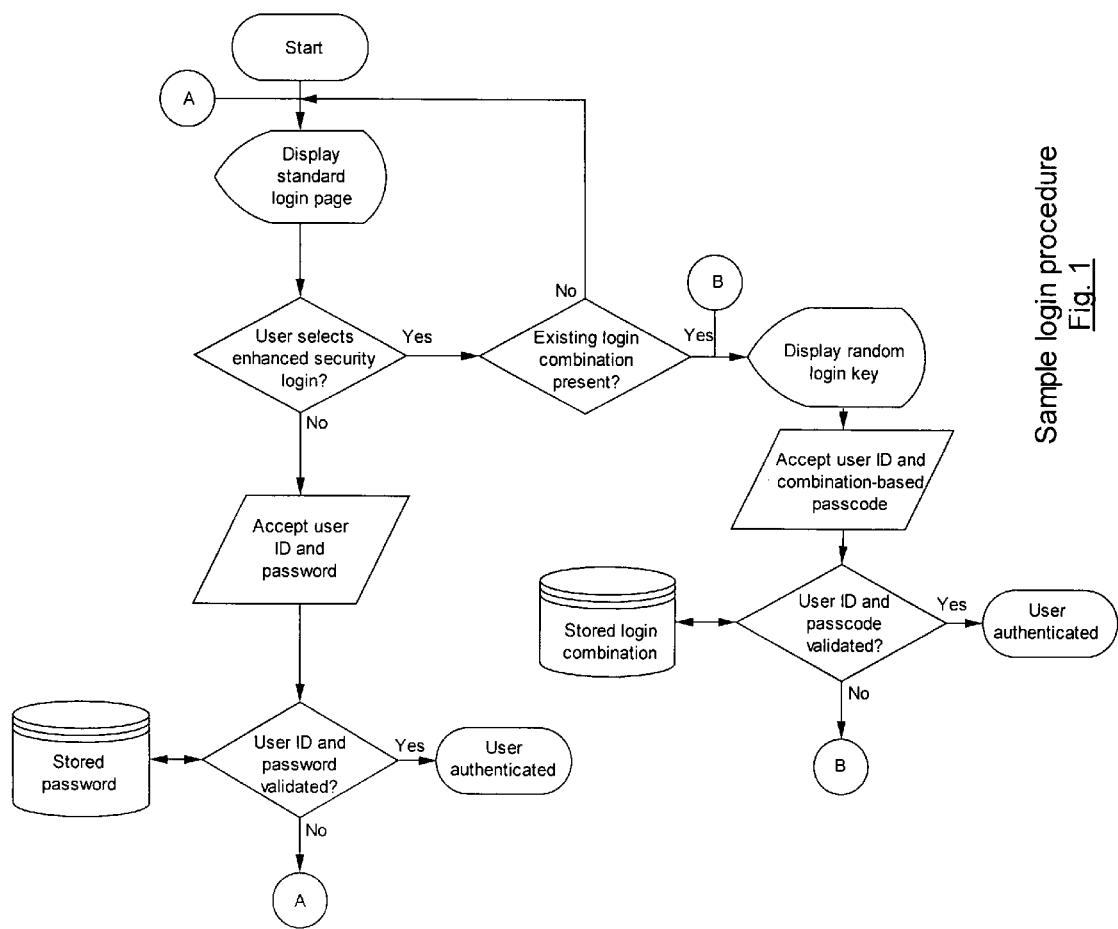
FIG. 1 illustrates a flowchart of a sample login procedure.

In the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention is directed at a method and system for a secure login solution using one-time passwords for users logging into computers and systems (local and/or remote) where authentication is required and which has access to a database or other means to record and retrieve the user's information, encrypted or otherwise. This user information could include an identification means such as a username/ID, a static reusable password (if used), a PIN code (if two-factor authentication is used), and a login key combination defined by the user.

It should be understood that although a username/ID is discussed herein as a means for identifying the user to the authenticating system, the present invention is not limited as such and contemplates any other suitable mechanisms for identifying the user to the system for the purposes of retrieving the user's login key combination.

The authentication steps, implemented on an authenticating system, generally include the following: displaying to the user information to indicate that the user is required to log in; displaying to the user the appropriate login page; displaying to the user a random login key and having the user enter his username/ID and a passcode generated from the random login key in relation to the user's login key combination as previously recorded; verifying that the user supplied username/ID and passcode match the username/ID and the passcode as determined from the random login key and the user's login key combination; and authenticating the user if the username/ID and passcode are matched. Optionally, the user can be offered to return to a standard login page if no previously recorded login key combination exists.

The random login key can consist of a random combination of characters of a fixed length and format, in accordance with the login key structure, and is generated by the authenticating system at every login attempt. For illustration purposes, an eight (8) character alpha-numeric lower- or upper-case passcode will offer close to 3 trillion possible combinations, while the same passcode using a case-sensitive login key would offer 218 trillion possible combinations. Although the user generated one-time passcode makes it meaningless to an attacker who discovers or intercepts it, encryption of the passcode during transmission over a network will further enhance security.

The user must first create a login key combination if none exists. The login key combination represents a fixed number of characters for each user, chosen in a particular sequence in response to a login key. The login key combination dictates the passcode which will be entered in response to the random login key, the passcode enabling authentication on subsequent logins.

If a login key combination does exist, then preferably the user is able to change the existing login key combination by first displaying to the user a random login key and having the user enter a passcode generated from this login key and the user's previously recorded login key combination. A database or other means is used to record the user's new or changed login key combination in association with other identifying information, such as the user's username/ID.

A verification step can be included, whereby the user verifies the new or changed login key combination by displaying a random login key and having the user enter a passcode generated from this login key and the user's most recently recorded login key combination. The user can then be notified that the entered passcode was correct or that the entered passcode was incorrect. In the latter case the user can try again or define a new login key combination.

The authenticating system may optionally assign a limited lifespan to the random login key. For example, the authenticating system could assign a lifespan of 30 or 60 seconds to the random login key, after which time it will have expired.

The user-defined sequential combination of the fixed number of characters for the login key combination can be of a fixed length for all users or of a length that falls within a specified minimum and maximum range, as determined by the authenticating system. For example, an authenticating system might prescribe a fixed length for all login key combinations or might allow users, at their discretion, to select a fixed number of characters that is no less than a prescribed minimum number of characters and no more than a prescribed maximum number of characters.

A system embodying the present invention includes a display means operable to provide instructions to a user, an input means operable to receive the user information (including login key combination and passcode), and a database or other means of storing and retrieving user information, including the user's identification means, the user's static reusable password (if used), the user's PIN code (if two-factor authentication is used) and the user's login key combination. The system may include a network of computers such that the user information for a plurality of users can be stored and retrieved on one or more centralized databases.

Although any system that requires user authentication will benefit from the present invention, one of the greatest beneficiaries of OTP systems will be e-commerce sites and banks. Most, if not all, banks still have their customers log in to do their Internet banking and pay their bills using static passwords to authenticate themselves, and the number of customers is growing.

Despite the explosive growth of online banking and online bill payment services, studies find that Internet users have growing concerns about security and the compromising of personal data.

One of the most often mentioned security problems frightening consumers is spyware, as mentioned above, which is malicious software installed on a user's machine without knowledge or authorization. This type of software comes in different flavours, with some that secretly log users' keystrokes to steal passwords and other sensitive information.

But the security problem online consumers say they find the most frightening is unauthorized access to their personal and financial information that criminals can use to steal identities and inflict serious damage to their finances and credit.

As a result, banks are under growing pressure to find more secure alternatives to the currently used static, reusable password. Unfortunately, the cost of implementing the use of authentication devices and their associated systems for such a large number of online banking customers would be prohibitive while the necessary help-desk activity and the ongoing management and replacement or removal of users would be extremely time consuming and create a logistical nightmare.

Advantageously, the present invention provides the same security of one-time passwords but without the high cost and management required for device-based systems. It is also significantly more user-friendly, and thus safer, for consumers than an S/KEY-based solution or solutions that require mathematical or other data manipulation on the part of the user.

The present invention can be implemented by companies directly into their own systems, or be used by a third party to provide the authentication service, redirecting the customer to the appropriate system after the customer has been successfully authenticated.

Any presently available or future developed computer software language and/or hardware components can be employed in the embodiments of the present invention, in a manner that is known. For example, the functionality mentioned above could be implemented using many different computer software languages, including VISUAL BASIC™, JAVA™, C™, C++™ or any assembly language appropriate in view of the processor being used, or any combination of such software languages, in a manner that is known.

The present invention significantly enhances login security for users logging into computers and systems that require authentication. As various changes can be made in the embodiments and operating methods without departing from the spirit or scope of the invention, it is intended that all matter contained in the above description or shown in the accompanying drawings and figures should be interpreted as illustrative and not in a limiting use.

EXAMPLE

Login Procedure

The flow chart of the login procedure provided as FIG. 1 illustrates a process that could be used by an authenticating system. If the option of authenticating a user by a username/ID and a matching static, reusable password is available, the authenticating system would direct the user to a standard login page where the user can supply and submit this information. If the username/ID and the password match, the user is authenticated and allowed access, otherwise the user will be so advised and be requested to try again.

On the standard login page the user will also be given the opportunity to proceed to the enhanced security login page where a random login key is displayed. The user is requested to supply and submit his username/ID and a passcode created from the displayed login key and the user's previously defined login key combination. If the username/ID and the passcode generated from the supplied login key match, the user will be allowed access, otherwise the user will be so advised and be redirected back to the enhanced security login screen to try again.

Since, in order to use the enhanced security option the user must have previously defined a login key combination which must also be available to the authenticating system, the user is offered the opportunity to return to the standard login page if he has not already done so.

FIG. 2 depicts a sample login screen where a username/ID and a password can be used for authentication purposes. This type of authentication is generally used and appropriate when access is sought to systems in a more secure environment, including for example from a computer which is the user's own. If enhanced security is required the user will have the option to go to the enhanced security login page.

FIG. 3 and FIG. 4 show a sample enhanced security login screen where a random login key is displayed and the user is requested to provide a username/ID and a passcode generated from the login key and the user's pre-defined login key combination. The login key, randomly generated by the authenticating system, is different with every login attempt. The login key structure for FIG. 3 is simply a horizontal line of characters, with five sets of four characters separated by a hyphen. FIG. 4, where the login key structure is in matrix form, may be easier for some users to recall their login key combination since the login key combination can take the form of a familiar geometric shape, such as "L", "T", or "X".

In cases where static, reusable passwords are not used, the user will be presented with this login screen only. The reference to the standard login screen would in such case of course be omitted. Random login keys can be given a limited lifespan, for example 30 seconds, after which they will have expired.

Defining the Login Key Combination

Figure 5:
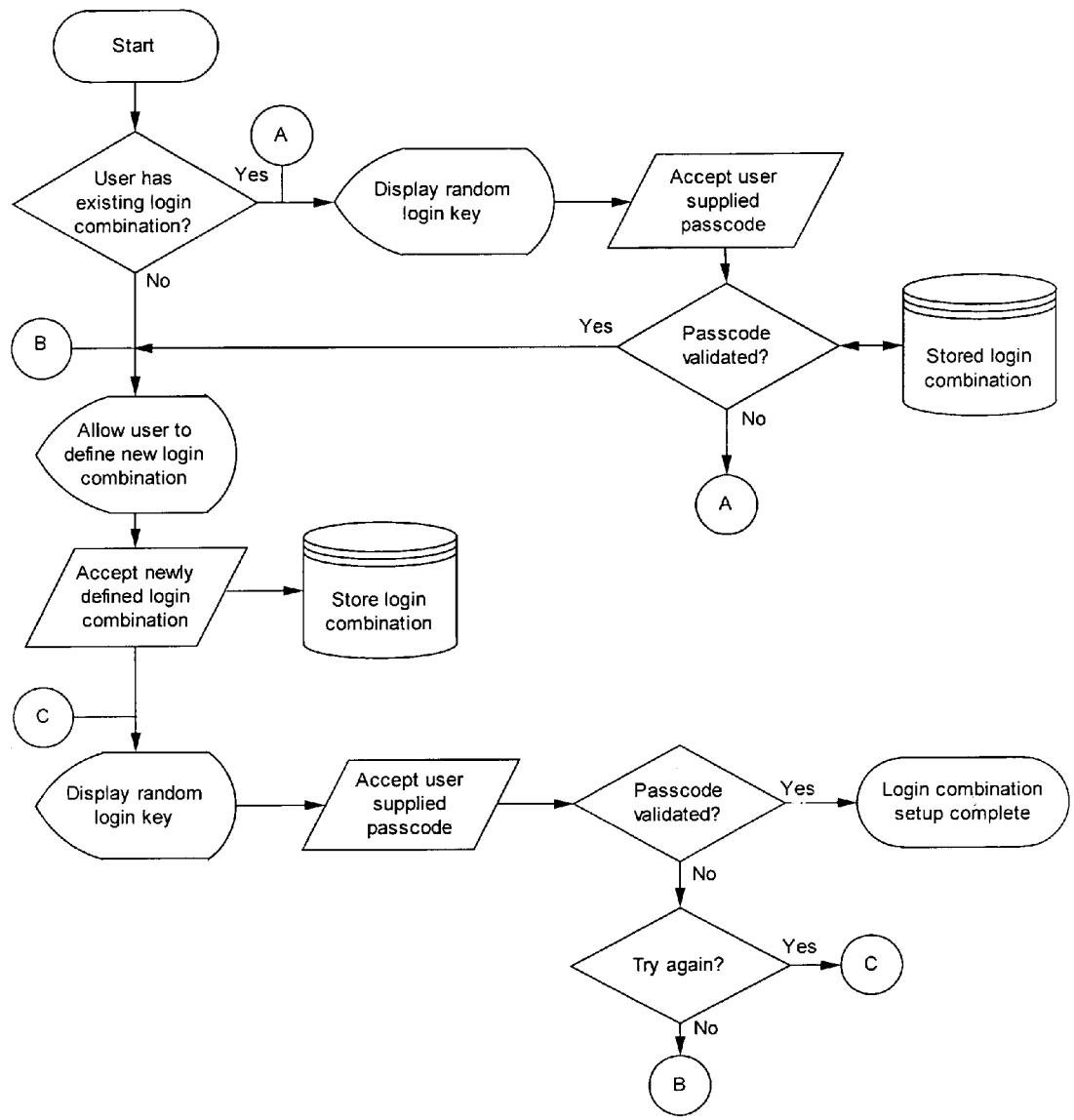
FIG. 5 illustrates a flowchart of a sample login combination definition procedure.

The user must first establish their login key combination. As shown by way of example in FIG. 5, the procedure for defining a login key combination is a process that can be used by an authenticating system. The authenticating system identifies whether the user already has a previously defined login key combination. If the user does not, he will be directed to the login key combination definition screen. If he does have a previously defined login key combination, he will be shown a random login key and be requested to provide the proper passcode created from that login key and the user's previously defined login key combination. If the supplied passcode is correct, the user would be directed to the login key combination definition screen.

On the definition screen the user will be asked to create a login key combination by defining a specific number of characters and a specific order in which those characters will be entered from the random login key, to create the correct one-time passcode.

After the user defined combination has been recorded, the user may be asked to verify his combination by having the authenticating system display a random login key and asking the user to provide the proper passcode based on the displayed login key and his just defined login key combination.

If the supplied passcode was correct the user will be so notified, if it is incorrect he will be so notified and offered the opportunity to try again by entering the correct passcode or he will be able to define a new login key combination.

FIG. 6 and FIG. 7 illustrate sample screens where a user defined login combination already exists and the user is asked to authenticate himself before being allowed to create a new combination.

Once the user is authenticated, or if this is the first time a login key combination is to be recorded, the user is given instructions to define a number of characters and the order in which those characters will be entered from the random login key, in order to create the correct one-time passcode on subsequent logins. This is shown in FIG. 8 and FIG. 9. The number of characters required for a passcode must be fixed for each user but, depending on the authenticating system, individual users may be allowed to have passcodes with a length that falls in a specified range. This sample screen shows that a system specified fixed number of eight characters will be used for the passcode. The user is free to select characters in any random order and is allowed to select the same character more than once. In this sample screen, characters are selected by clicking them in the order in which they will be entered on subsequent logins.

Once the login key combination has been defined and recorded, this sample screen allows the user the opportunity to confirm his definition by entering a valid passcode based on a random login key and the just recorded combination. This is shown in FIG. 10 and FIG. 11.

An acknowledgement like that depicted in FIG. 12 shows the user that the entered passcode was correct.

Alternatively, as shown in FIG. 13 and FIG. 14, the screen indicates to the user that the entered passcode was incorrect and the user is given the option to enter the proper combination again or to define a new login key combination.

Variations or modifications to the design and construction of this invention, within the scope of the invention, may occur to those skilled in the art upon reviewing the disclosure herein. Such variations or modifications, if within the spirit of the invention, are intended to be encompassed within the scope of any claims or patent protection issuing upon this invention.

What is claimed is:

1. A method for enabling a user to obtain access to protected resources, the method comprising:
   (a) providing a matrix to the user via a display means, the matrix containing, in random positions, the individual characters contained in a static PIN code previously defined by the user, with the remaining positions of the matrix filled exclusively by randomly selected characters;
   (b) receiving from the user, via an input means:
      (i) identification information that identifies the user; and
      (ii) a single passcode which is generated by the user in response to providing the matrix, the passcode comprising two distinct components:
         (A) a variable component, the variable component comprising characters selected by the user from those contained in the matrix based on a login combination previously defined by the user, the login combination comprising a specific number of characters entered in a specific, user defined sequential pattern, the pattern determined solely by relative positions of the characters in the matrix; and
         (B) the static PIN code previously defined by the user, the characters of which are contained in the matrix;
   (c) an authentication process performed by a computer processor, wherein the user obtains access to the protected resources when:
      (i) the user supplied identification information matches identification information associated with the user; and
      (ii) the user supplied passcode comprises both the static PIN code associated with the user and the variable component comprising the characters from the matrix matching the login combination associated with the user.

2. A system for authenticating a user requesting access to protected resources, the system comprising:
   (a) a display means linked to a computer providing instructions to the user, including a matrix containing, in random positions, the individual characters contained in a static PIN code previously defined by the user, with the remaining positions of the matrix filled exclusively by randomly selected characters;
   (b) an input means linked to the computer enabling the user to supply information allowing the system to determine the user identity and a passcode generated by the user;
   (c) a means for storing and retrieving the user credentials, the user credentials comprising:
      (i) identification information associated with the user to establish the identity of the user; and
      (ii) a login combination previously defined by the user, the login combination comprising a specific number of characters entered in a specific, user defined sequential pattern, the pattern determined solely by relative positions of the characters in the matrix; and
      (iii) the static PIN code previously defined by the user;
   (d) an authentication facility linked to the computer, the authentication facility providing instructions to the computer to:
      (i) provide the matrix to the user via the display means;
      (ii) receive from the user, via the input means, the identification information associated with the user and a passcode generated by the user;
      (iii) the authentication facility performing an authentication process, wherein the user obtains access to the protected resources when:
         (A) the user supplied identification information matches the identification information associated with the user; and
         (B) the user supplied passcode comprises both the static PIN code associated with the user and the characters from the matrix matching the login combination associated with the user.

3. A computer program product, for use on a computer, the computer program product comprising:
   (a) a computer usable storage medium, excluding signals; and
   (b) computer readable program code recorded or storable on the computer usable storage medium, the computer readable program code defining an authentication application which, when executed by the computer, causes the computer to perform a method for enabling a user to obtain access to protected resources, comprising the steps of:
      (i) providing a matrix to the user via a display means, the matrix containing, in random positions, the individual characters contained in a static PIN code previously defined by the user, with the remaining positions of the matrix filled exclusively by randomly selected characters;
      (ii) receiving from the user, via an input means, identification information associated with the user and a passcode generated by the user;
      (iii) performing an authentication process wherein the user obtains access to the protected resources when:
         (A) the user supplied identification information matches the identification information associated with the user; and
         (B) the user supplied passcode comprises both the static PIN code associated with the user and, the characters from the matrix matching a login combination associated with the user, the login combination comprising a specific number of characters entered in a specific, user defined sequential pattern, the pattern determined solely by relative positions of the characters in the matrix.

* * * * *